(12) United States Patent
Harding (10) Patent No.: US 7,200,636 B2
(45) Date of Patent: Apr. 3, 2007

(54) METHOD AND APPARATUS FOR APPLYING PERSONALIZED RULES TO E-MAIL MESSAGES AT AN E-MAIL SERVER

(75) Inventor: Michael A. Harding, El Granada, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 736 days.

(21) Appl. No.: 10/286,568

(22) Filed: Nov. 1, 2002

(65) Prior Publication Data

US 2004/0088357 A1  May 6, 2004

(51) Int. Cl.
*G06F 15/16* (2006.01)
(52) U.S. Cl. ............... 709/206; 709/203; 709/217; 709/227
(58) Field of Classification Search ........... 709/206, 709/217–227, 200–203
See application file for complete search history.

(56) References Cited

U.S. PATENT DOCUMENTS

| | | | | |
|---|---|---|---|---|
| 5,917,489 A | * | 6/1999 | Thurlow et al. ............ | 715/809 |
| 5,978,566 A | * | 11/1999 | Plank et al. ............... | 709/206 |
| 6,052,709 A | * | 4/2000 | Paul ........................... | 709/202 |
| 6,363,415 B1 | * | 3/2002 | Finney et al. .............. | 709/206 |
| 6,438,583 B1 | * | 8/2002 | McDowell et al. ......... | 709/206 |
| 6,606,616 B1 | * | 8/2003 | Selzer ........................ | 706/47 |
| 6,654,787 B1 | * | 11/2003 | Aronson et al. ........... | 709/206 |
| 6,779,021 B1 | * | 8/2004 | Bates et al. ................ | 709/206 |
| 7,136,920 B2 | * | 11/2006 | Castell et al. .............. | 709/224 |
| 2002/0116463 A1 | * | 8/2002 | Hart ........................... | 709/206 |
| 2003/0229668 A1 | * | 12/2003 | Malik ........................ | 709/206 |
| 2004/0054733 A1 | * | 3/2004 | Weeks ....................... | 709/206 |
| 2004/0073619 A1 | * | 4/2004 | Gilhuly et al. ............. | 709/206 |
| 2005/0144246 A1 | * | 6/2005 | Malik ........................ | 709/206 |
| 2006/0265463 A1 | * | 11/2006 | Amir et al. ................ | 709/206 |

\* cited by examiner

*Primary Examiner*—Moustafa M. Meky
(74) *Attorney, Agent, or Firm*—Park, Vaughan & Fleming, LLP; Edward J. Grundler (57) ABSTRACT

One embodiment of the present invention provides a system that applies personalized rules for handling e-mail messages to e-mail messages within an e-mail server. During operation, the system connects to the e-mail server from a remote computer system on behalf of a user. Next, the system applies the personalized rules to e-mail messages received for the user at the e-mail server. This involves applying actions specified in the personalized rules to the e-mail messages. Next, the system disconnects from the e-mail server so that the connection does not have to be maintained.

27 Claims, 4 Drawing Sheets

METHOD AND APPARATUS FOR APPLYING PERSONALIZED RULES TO E-MAIL MESSAGES AT AN E-MAIL SERVER

BACKGROUND

1. Field of the Invention

The present invention relates to systems for distributing electronic mail (e-mail). More specifically, the present invention relates to a method and an apparatus for using a pseudo-client to apply personalized rules to e-mail messages within an e-mail server.

2. Related Art

The rapid proliferation in e-mail in recent years is largely due to the convenience, speed, and low-cost of sending e-mail messages in comparison to other forms of communication. Unfortunately, these advantages also make it easier for advertisers and other entities to cheaply and rapidly distribute mass quantities of junk e-mail to millions of e-mail users. This problem has grown so large that it is now common for some e-mail users to receive hundreds of junk e-mail messages each day. This tremendous volume of junk e-mail takes a great deal of time to sort through, which causes great annoyance to e-mail users.

To remedy this problem, a number of e-mail filters have been developed to filter out unwanted e-mail messages using pre-defined filtering criteria. Existing e-mail filters can either be located at an e-mail client system, or alternatively, at an e-mail server system.

A client-based e-mail filter is typically applied to e-mail messages whenever a request to check mail is sent to an e-mail server from the client computing system. An e-mail user is typically able to customize filtering rules stored on the client to meet his or her specific needs.

However, a client-based e-mail filter may not be effective if the user switches between different client machines. For example, many users are mobile today, accessing e-mail from many different devices. If a user retrieves e-mail from another device, such as a portable computing device or a computer system belonging to another user, the customized filtering rules may not be available on the other device. In this case, it is not be possible to apply the customized filtering rules. Moreover, although it is possible to configure multiple clients to apply the same customized set of filtering rules, the process of configuring multiple clients is time-consuming. Furthermore, the task of updating and maintaining these filtering rules on multiple clients is also time-consuming.

In contrast, a server-based e-mail filter operates on an e-mail server computer system that processes e-mail for multiple e-mail users. As with a client-based e-mail filter, customized filtering rules can be applied at the e-mail server to filter out unwanted e-mail messages. However, there is a limitation to the number of rules that can be enforced on an e-mail server because each rule adds load to the server, which can reduce performance. Given this limitation, most server-based filtering rules are enforced over large sets of users homogeneously. This homogenous application of rules helps with problems for the entire user community. However, it hinders personalization of e-mail filtering.

Another problem with server-based e-mail filters is that a given user may access a number of different mail servers, and each of these mail servers may apply a different set filtering rules. Hence, the user is likely encounter different e-mail filtering criteria for different e-mail servers.

Hence, what is needed is a method and an apparatus for applying personalized rules for handling e-mail messages without the problems listed above.

SUMMARY

One embodiment of the present invention provides a system that applies personalized rules for handling e-mail messages to e-mail messages within an e-mail server. During operation, the system connects to the e-mail server from a remote computer system on behalf of a user. Next, the system applies the personalized rules to e-mail messages received for the user at the e-mail server. This involves applying actions specified in the personalized rules to the e-mail messages. Next, the system disconnects from the e-mail server so that the connection does not have to be maintained.

In a variation on this embodiment, the system periodically sends a summary e-mail message to the user, wherein the summary e-mail message summarizes actions applied to e-mail messages on behalf of the user.

In a variation on this embodiment, applying the personalized rules involves filtering out unwanted e-mail messages from the e-mail messages received for the user.

In a further variation, the unwanted e-mail messages are moved into a possible junk folder. Moreover, e-mail messages in the possible junk folder are automatically deleted if not acted upon the by the user within a pre-specified, user-definable period of time.

In a further variation, if a given e-mail message in the possible junk folder is subsequently acted upon by the user, the system modifies the personalized rules so that subsequent e-mail messages received from a sender of the given e-mail message are not moved into the possible junk folder.

In a variation on this embodiment, while applying the personalized rules, the system looks up the personalized rules for the user in a database and then assembles the personalized rules within a lookup structure. Next, the system uses the lookup structure to apply the personalized rules to e-mail messages received for the user.

In a variation on this embodiment, the system applies the personalized rules periodically so that the personalized rules are continually applied to new e-mail messages received for the user at the e-mail server.

In a variation on this embodiment, the system applies the personalized rules to multiple e-mail servers associated with the user.

In a variation on this embodiment, while applying the personalized rules, the system forwards selected e-mail messages to a single primary e-mail server for the user, so that selected e-mail messages are aggregated at the single primary e-mail server for the user.

In a variation on this embodiment, the system additionally allows the user to add, delete and/or modify personalized rules associated with the user.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Clients and Servers

Figure 1:
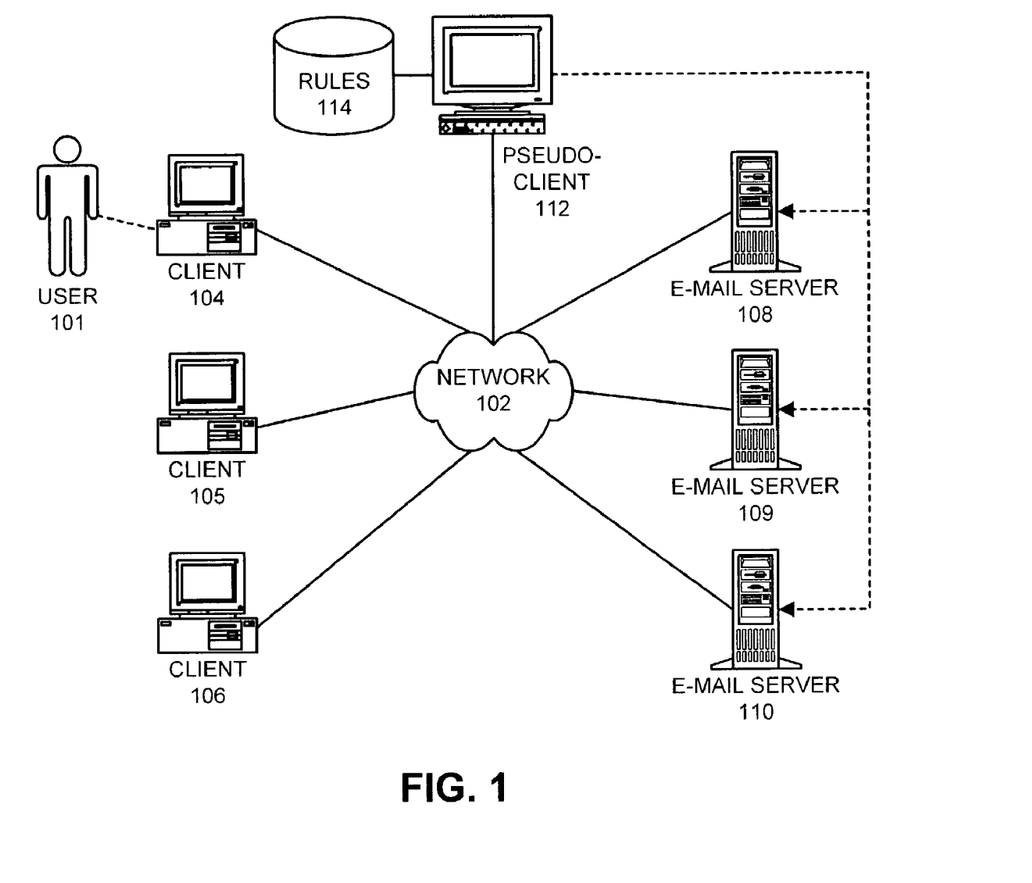
FIG. 1 illustrates a number of clients and servers in accordance with an embodiment of the present invention.

FIG. 1 illustrates a number of clients and servers in accordance with an embodiment of the present invention. As is illustrated in FIG. 1, clients 104–106 and a pseudo-client 112 communicate with e-mail servers 108–110 through network 102.

Clients 104–106, e-mail servers 108–110 and pseudo-client 112 operate on respective computer systems. These computer systems generally include any type of computer system, including, but not limited to, a computer system based on a microprocessor, a mainframe computer, a digital signal processor, a portable computing device, a personal organizer, a device controller, and a computational engine within an appliance. Moreover, clients 104–106 and pseudo-client 112 include a mechanism for making requests for e-mail services upon e-mail servers 108–110, and e-mail servers 108–110 correspondingly include a mechanism for servicing requests from clients 104–106 and pseudo-client 112.

During operation, a user 101 interacts with an e-mail application running on client 104. This e-mail application in turn interacts with e-mail servers 108–110 to send and/or receive e-mail for user 101. Furthermore, pseudo-client 112 periodically accesses e-mail servers 108–110 on behalf of user 101 to apply a set of rules to e-mail messages received by e-mail servers 108–110 for user 101. The actions of pseudo-client 112 are described in more detail below with reference to FIGS. 2–6.

Pseudo-Client

Figure 2:
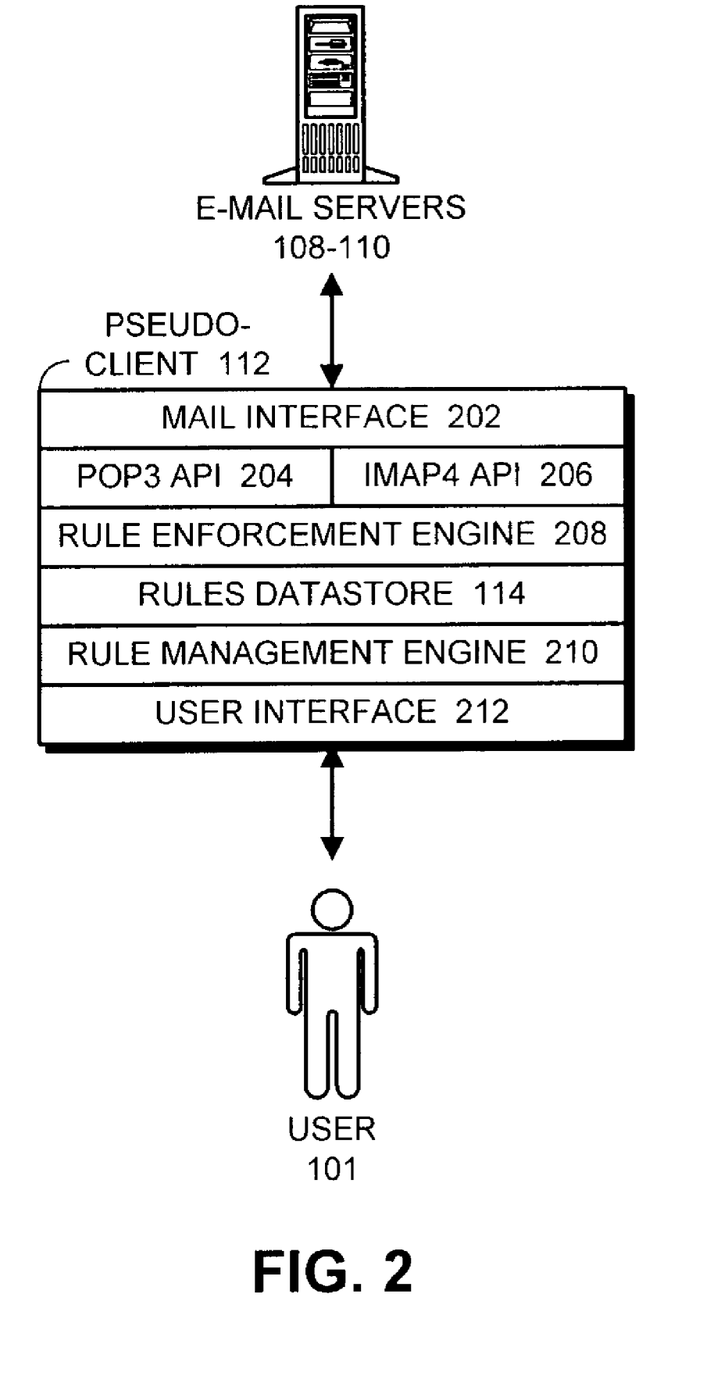
FIG. 2 illustrates a pseudo-client that interacts with e-mail servers in accordance with an embodiment of the present invention.

FIG. 2 illustrates a pseudo-client 112 that interacts with e-mail servers 108–110 in accordance with an embodiment of the present invention. At the heart of pseudo-client 112 is a rules datastore 114, which stores personalized rules for handling e-mail messages for users.

A given user can modify these rules by interacting with rule management engine 210 within pseudo-client 112 through user interface 212. Note that rule management engine 210 facilitates adding, removing and/or modifying rules within rules datastore 114.

Also note that this interaction with user 101 can take place through a web browser, or through actions that user 101 performs on e-mail messages. For example, if user 101 replies to an e-mail message from a previously unknown sender, it may cause rule management engine 210 to add a corresponding rule associated with the previously unknown sender to rules datastore 114. This rule ensures that subsequent e-mail messages from the previously unknown sender are not deleted.

In one embodiment of the present invention, during an initial registration process, user 101 registers one or more mailboxes with pseudo-client 112 through user interface 212. Next, user 101 selects one or more rule/filter templates to apply to the registered mailboxes, and then modifies the selected rule/filter templates, if necessary, to meet the user's requirements.

Rules enforcement engine 208, applies rules within rules datastore 214 to mail servers 108–110. This can be accomplished using any standard mail protocol. For example, in one embodiment of the present invention, rule enforcement engine 208 does this using either the Post Office Protocol 3 (POP3) protocol or the Internet Message Access Protocol 4 (IMAP4) protocol by making calls through a POP3 application programming interface (API) 204 or an IMAP4 API, respectively. These calls pass through mail interface 202 to facilitate communications with e-mail servers 108–110.

Processing of E-mail Messages

Figure 3:
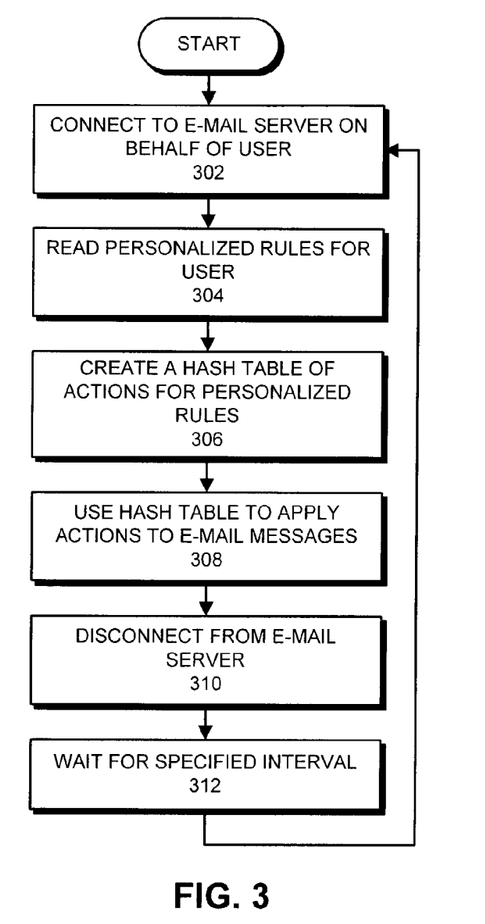
FIG. 3 presents a flow chart illustrating processing of e-mail messages on an e-mail server in accordance with an embodiment of the present invention.

FIG. 3 presents a flow chart illustrating processing of e-mail messages on an e-mail server in accordance with an embodiment of the present invention. The processing starts when pseudo-client 112 establishes a connection, on behalf of a user 101 to an e-mail server 108 (step 302).

Next, pseudo-client 112 reads personalized rules for user 101 from rules datastore 114 (step 304). Note that these personalized rules can generally include any type of commonly used e-mail filtering rules. In one embodiment of the present invention, a given personalized rule identifies a specific component of the e-mail message, a specific value or set of values for the component, and an action to take if the value or set of values is found within the component. For example, e-mail message components can generally include any component an e-mail message, such as: the "to" field, the "from" field, the subject, the domain, the account, the server chain through which the message was delivered, authentication information, the message body, and the presence (or absence) of an attachment. The values for these components can generally include any of the possible values for these components. The actions for a given rule can include any action that can be performed on an e-mail message, such as: filtering out the message, presenting the message to the user, placing the message in a specific folder, or forwarding the message to another server.

Pseudo-client 112 uses these personalized rules to create a lookup structure, such as a hash table, for the personalized rules (step 306). This hash table allows pseudo-client 112 to rapidly determine whether a rule applies to a given e-mail message while scanning though components of the given e-mail message.

Next, pseudo-client 112 uses this hash table to apply actions associated with the personalized rules to e-mail messages received for user 101 by e-mail server 108 (step 308). In one embodiment of the present invention, this involves examining each e-mail message received for user 101 in turn, and applying the applicable personalized rule (or rules) to each e-mail message.

Pseudo-client 112 then disconnects from e-mail server 108 (step 310) and waits for a specified time interval (step 312), for example five minutes, before returning to step 302 to repeat the process. In this way, the personalized rules are continually applied to subsequent e-mail messages that arrive at e-mail server 108 for user 101.

Summary Messages

Figure 4:
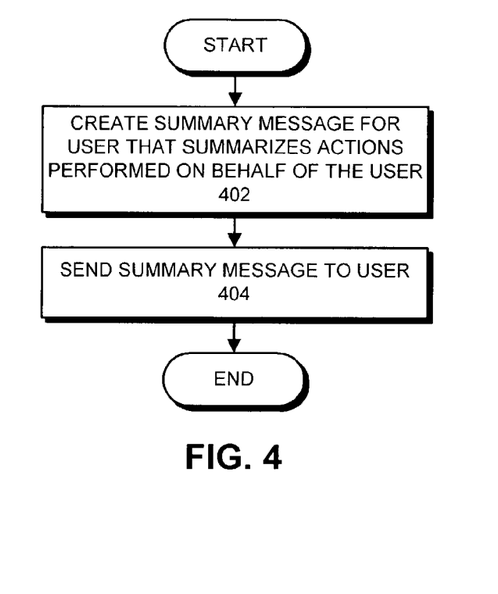
FIG. 4 presents a flow chart illustrating the process of generating and sending a summary message in accordance with an embodiment of the present invention.

FIG. 4 presents a flow chart illustrating the process of generating and sending a summary message in accordance with an embodiment of the present invention. During this process, pseudo-client 112 periodically creates a summary message (step 402). This summary message summarizes the actions performed by pseudo-client 112 on behalf of user 101. The summary message can also summarize all of the messages that have been deposited into a "possible junk" folder as is described in more detail below with reference to FIG. 5.

Next, pseudo-client 112 sends the message to user 101 (step 404). This allows user 101 to periodically evaluate the actions of pseudo-client 112.

Filtering E-mail Messages

Figure 5:
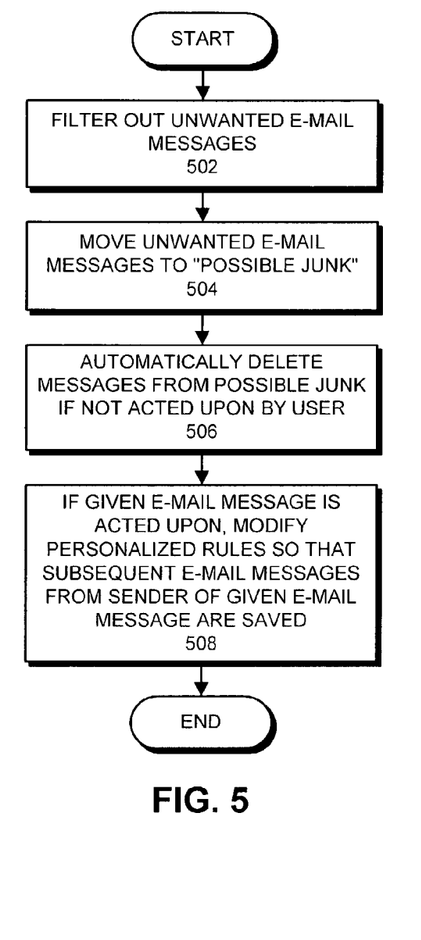
FIG. 5 presents a flow chart illustrating the process of filtering e-mail messages in accordance with an embodiment of the present invention.

FIG. 5 presents a flow chart illustrating the process of filtering e-mail messages in accordance with an embodiment of the present invention. Note that the process of applying actions to e-mail messages in step 308 of FIG. 3 can involve filtering out unwanted e-mail messages (step 502). This process can involve either filtering out e-mail messages that match certain criteria, or alternatively, accepting messages that match certain criteria, and then filtering out the remaining messages.

Next, the system moves unwanted e-mail messages to a possible junk folder (step 504). The subsequently system deletes messages in the possible junk folder if the messages are not acted upon by the user within a given time interval— for example, three days (step 506). Note that a summary of e-mail messages that have been moved to the possible junk folder can be periodically sent to the user as is described above with reference to FIG. 5. This allows the user to take action upon a specific e-mail message, if the specific e-mail message is, for example, erroneously moved into the possible junk folder.

Next, if a given e-mail message is acted upon by the user, the system can modify personalized rules for the user so that subsequent e-mail messages from the sender of the e-mail message are not moved into the possible junk folder, but are instead saved to be viewed by the user (step 508). In one embodiment of the present invention, if the user selects an e-mail message to be acted upon, the system presents a form to the user with radio buttons that can be selected by the user to apply different actions to the e-mail message.

Forwarding E-mail Messages

Figure 6:
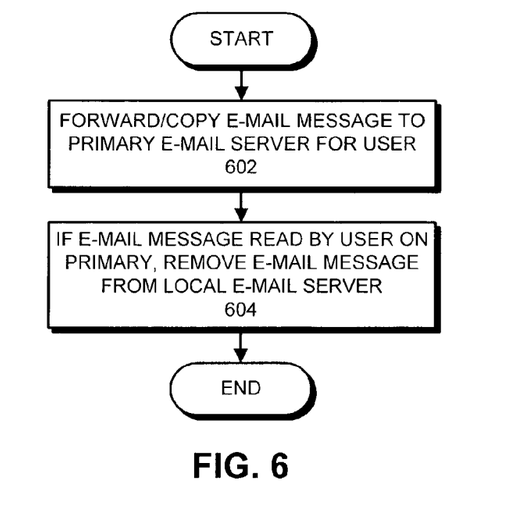
FIG. 6 presents a flow chart illustrating the process of forwarding e-mail messages in accordance with an embodiment of the present invention.

FIG. 6 presents a flow chart illustrating the process of forwarding e-mail messages in accordance with an embodiment of the present invention. During the process of applying actions to e-mail messages in step 308 of FIG. 3, the actions can involve forwarding or copying specified e-mail messages to a primary e-mail server (step 602). Note that users often interact with multiple e-mail servers. For example, in FIG. 1, user 101 can interact with e-mail servers 108–110. In this case, it is often convenient if e-mail messages from e-mail servers 108–110 are aggregated on a single primary server, for example e-mail server 109. This can be done be forwarding or copying e-mail messages from the other e-mail servers 108 and 110 to e-mail server 109.

In order to reduce the chance of an e-mail message being lost during this forwarding process, it may be desirable to perform a two-phase commit operation to ensure that each e-mail message is successfully transferred to the primary e-mail server 109. Alternatively, the system can wait for a given e-mail message to be read by the user from primary e-mail server 109 before removing the given e-mail message from a local e-mail server 108 that originally received the message (step 604).

Note that the above-described technique for managing e-mail messages has a number of advantages. Unlike, a client-based e-mail filtering mechanism, it works even it the user logs in from a different client. Unlike a server-based e-mail filtering mechanism, it can be applied to multiple servers. Moreover, the above-described technique provides the user with a useful summary message that conveniently informs the user about actions that were performed by the pseudo-client on behalf of the user.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for applying personalized rules for handling e-mail messages to e-mail messages within an e-mail server, comprising:
    connecting to the e-mail server from a pseudo-client on a remote computer system on behalf of a user, wherein the pseudo-client periodically accesses the e-mail server on behalf of the user, and wherein the pseudo-client interacts with the user through a client that is separate from the pseudo-client;
    applying the personalized rules to e-mail messages received for the user at the e-mail server, wherein the rules are applied by the pseudo-client;
    wherein applying the personalized rules involves continually applying actions specified in the personalized rules to the new e-mail messages;
    disconnecting from the e-mail server; and
    waiting a specified interval before re-establishing a connection with the e-mail server.

2. The method of claim 1, further comprising periodically sending a summary e-mail message to the user, wherein the summary e-mail message summarizes actions applied to e-mail messages on behalf of the user.

3. The method of claim 1, wherein applying the personalized rules involves filtering out unwanted e-mail messages from the e-mail messages received for the user.

4. The method of claim 3,
    wherein the unwanted e-mail messages are moved into a possible junk folder; and
    wherein e-mail messages in the possible junk folder are automatically deleted if not acted upon the by the user.

5. The method of claim 4, wherein if a given e-mail message in the possible junk folder is subsequently acted upon by the user, the method further comprises modifying the personalized rules so that subsequent e-mail messages received from a sender of the given e-mail message are not moved into the possible junk folder.

6. The method of claim 1, wherein applying the personalized rules involves:
   looking up the personalized rules for the user in a database;
   assembling the personalized rules within a lookup structure; and
   using the lookup structure to apply the personalized rules to the e-mail messages received for the user.

7. The method of claim 1, wherein the method is applied to multiple e-mail servers associated with the user.

8. The method of claim 7, wherein applying the personalized rules involves forwarding selected e-mail messages to a single primary e-mail server for the user, so that selected e-mail messages are aggregated at the single primary e-mail server for the user.

9. The method of claim 1, further comprising allowing the user to add, delete and/or modify personalized rules associated with the user.

10. A computer-readable storage medium storing instructions that when executed by a computer cause the computer to perform a method for applying personalized rules for handling e-mail messages to e-mail messages within an e-mail server, the method comprising:
   connecting to the e-mail server from a pseudo-client on a remote computer system on behalf of a user, wherein the pseudo-client periodically accesses the e-mail server on behalf of the user, and wherein the pseudo-client interacts with the user through a client that is separate from the pseudo-client;
   applying the personalized rules to e-mail messages received for the user at the e-mail server, wherein the rules are applied by the pseudo-client; wherein applying the personalized rules involves continually applying actions specified in the personalized rules to the e-mail messages;
   disconnecting from the e-mail server; and
   waiting a specified interval before re-establishing a connection with the e-mail server.

11. The computer-readable storage medium of claim 10, wherein the method further comprises periodically sending a summary e-mail message to the user, wherein the summary e-mail message summarizes actions applied to e-mail messages on behalf of the user.

12. The computer-readable storage medium of claim 10, wherein applying the personalized rules involves filtering out unwanted e-mail messages from the e-mail messages received for the user.

13. The computer-readable storage medium of claim 12,
   wherein the unwanted e-mail messages are moved into a possible junk folder; and
   wherein e-mail messages in the possible junk folder are automatically deleted if not acted upon the by the user.

14. The computer-readable storage medium of claim 13, wherein if a given e-mail message in the possible junk folder is subsequently acted upon by the user, the method further comprises modifying the personalized rules so that subsequent e-mail messages received from a sender of the given e-mail message are not moved into the possible junk folder.

15. The computer-readable storage medium of claim 10, wherein applying the personalized rules involves:
   looking up the personalized rules for the user in a database;
   assembling the personalized rules within a lookup structure; and
   using the lookup structure to apply the personalized rules to the e-mail messages received for the user.

16. The computer-readable storage medium of claim 10, wherein the method is applied to multiple e-mail servers associated with the user.

17. The computer-readable storage medium of claim 16, wherein applying the personalized rules involves forwarding selected e-mail messages to a single primary e-mail server for the user, so that selected e-mail messages are aggregated at the single primary e-mail server for the user.

18. The computer-readable storage medium of claim 10, wherein the method further comprises allowing the user to add, delete and/or modify personalized rules associated with the user.

19. An apparatus that applies personalized rules for handling e-mail messages to e-mail messages within an e-mail server, comprising:
   a connection mechanism configured to establish a connection to the e-mail server from a pseudo-client on a remote computer system on behalf of a user, wherein the pseudo-client periodically accesses the e-mail server on behalf of the user, and wherein the pseudo-client interacts with the user through a client that is separate from the pseudo-client;
   a rule application mechanism configured to apply the personalized rules to e-mail messages received for the user at the e-mail server, wherein the rules are applied by the pseudo-client; wherein the rule application mechanism is configured to continually apply actions specified in the personalized rules to the e-mail messages;
   wherein the connection mechanism is configured to disconnect from the e-mail server after the personalized rules have been applied to the e-mail messages on the e-mail server; and
   wherein the connection machine is configured to wait a specified interval before re-establishing a connection with the e-mail server.

20. The apparatus of claim 19, further comprising a summary mechanism configured to periodically send a summary e-mail message to the user, wherein the summary e-mail message summarizes actions applied to e-mail messages on behalf of the user.

21. The apparatus of claim 19, wherein the rule application mechanism is configured to filter out unwanted e-mail messages from the e-mail messages received for the user.

22. The apparatus of claim 21,
   wherein the rule application mechanism is configured to move unwanted e-mail messages into a possible junk folder; and
   wherein the rule application mechanism is configured to automatically delete e-mail messages in the possible junk folder if not acted upon by the user.

23. The apparatus of claim 22, further comprising a rule modification mechanism, wherein if a given e-mail message in the possible junk folder is subsequently acted upon by the user, the rule modification mechanism is configured to modify the personalized rules so that subsequent e-mail messages received from a sender of the given e-mail message are not moved into the possible junk folder.

24. The apparatus of claim 19, wherein the rule application mechanism is configured to:
   look up the personalized rules for the user in a database;
   assemble the personalized rules within a lookup structure; and to use the lookup structure to apply the personalized rules to the e-mail messages received for the user.

25. The apparatus of claim 19, wherein the rule application mechanism is configured to apply the personalized rules to multiple e-mail servers associated with the user.

26. The apparatus of claim 25, wherein the rule application mechanism is configured to forward selected e-mail messages to a single primary e-mail server for the user, so that selected e-mail messages are aggregated at the single primary e-mail server for the user.

27. The apparatus of claim 19, further comprising a rule modification mechanism configured to allow the user to add, delete and/or modify personalized rules associated with the user.

* * * * *

UNITED STATES PATENT AND TRADEMARK OFFICE
CERTIFICATE OF CORRECTION

| | | |
|---|---|---|
| PATENT NO. | : 7,200,636 B2 | |
| APPLICATION NO. | : 10/286568 | |
| DATED | : April 3, 2007 | |
| INVENTOR(S) | : Michael A. Harding | |

It is certified that error appears in the above-identified patent and that said Letters Patent is hereby corrected as shown below:

In claim 4 (at column 6, line 64), please delete the phrase "the by the" and replace with the phrase --by the--.

In claim 13 (at column 7, line 55), please delete the phrase "the by the" and replace with the phrase --by the--.

Signed and Sealed this

Twelfth Day of June, 2007

JON W. DUDAS
*Director of the United States Patent and Trademark Office*